(12) United States Patent
Gao et al.

(10) Patent No.: US 11,561,444 B2
(45) Date of Patent: Jan. 24, 2023

(54) DISPLAY PANEL AND DISPLAY DEVICE

(71) Applicants: Hefei BOE Display Technology Co., Ltd., Anhui (CN); BOE Technology Group Co., Ltd., Beijing (CN)

(72) Inventors: Jilei Gao, Beijing (CN); Wei Zhang, Beijing (CN); Miao Yu, Beijing (CN); Benzhi Xu, Beijing (CN); Chao Li, Beijing (CN); Qi Liu, Beijing (CN); Xipeng Wang, Beijing (CN); Yonggang Zhang, Beijing (CN)

(73) Assignees: Hefei BOE Display Technology Co., Ltd., Anhui (CN); BOE Technology Group Co., Ltd., Bejing (CN)

( * ) Notice: Subject to any disclaimer, the term of this patent is extended or adjusted under 35 U.S.C. 154(b) by 0 days.

(21) Appl. No.: 17/515,032

(22) Filed: Oct. 29, 2021

(65) Prior Publication Data
US 2022/0299829 A1 Sep. 22, 2022

(30) Foreign Application Priority Data
Mar. 17, 2021 (CN) .......................... 202120546832.9

(51) Int. Cl.
*G02F 1/1362* (2006.01)

(52) U.S. Cl.
CPC .. *G02F 1/136286* (2013.01); *G02F 1/136209* (2013.01)

(58) Field of Classification Search
None
See application file for complete search history.

(56) References Cited

U.S. PATENT DOCUMENTS 9,733,534 B2 * 8/2017 Lin .................. G02F 1/133512

* cited by examiner

*Primary Examiner* — Richard H Kim
(74) *Attorney, Agent, or Firm* — IPro, PLLC

(57) ABSTRACT

A display panel and a display device are disclosed. The display panel includes a plurality of sub-pixels arranged in an array; gate line light shielding parts extending in a row direction are arranged on horizontal non-display areas between every two adjacent rows of sub-pixels; vertical non-display areas are arranged between every two sub-pixels adjacent in a row direction; at least one of the vertical non-display areas is provided with a vertical light shielding part, and the vertical light shielding part is configured to prevent two sub-pixels on two sides, in the row direction, of the vertical light shielding part from light leakage at a junction; and a gap is formed between the vertical light shielding part and each of two gate line light shielding parts adjacent to the vertical light shielding part.

14 Claims, 1 Drawing Sheet

DISPLAY PANEL AND DISPLAY DEVICE

CROSS REFERENCE TO RELATED APPLICATIONS

This application claims the priority of the Chinese patent application No. 202120546832.9 filed to the China National Intellectual Property Administration on Mar. 17, 2021, of which the entire contents are incorporated herein by reference.

FIELD

The present disclosure relates to the field of display, in particular to a display panel and a display device.

BACKGROUND

A mature design solution of an all screen at present is achieved through a display mode of ADS Pro (a systematic solution of a high-end LCD product), a GOA driving unit is placed on a side of a Data Pad, and a process is achieved through COA and an organic film. In a pixel design solution, a non-display area is arranged between two adjacent sub-pixels in a row direction, normal pixel electrodes and public electrodes are not designed in the non-display area, and theoretically, it is considered that the part of liquid crystal molecules do not deflect and are in a normally black state.

However, during actual display, on one hand, the area (the non-display area between every two adjacent sub-pixels) has a metal circuit (such as: H Gate/V gate/SDN com), and voltage jump to form a fringe field effect, resulting in deflection of the liquid crystal molecules and then making an L0 picture much brighter. On the other hand, speaking from a structure film layer, the area (the non-display area between every two adjacent sub-pixels) has no BM (black matrix) shielding, transmission of light is shielded only through an upper and lower Pol (Polaroid) and interception of metal, and thus the light cannot be totally shielded. Therefore, the whole L0 brightness in the area may be increased, and during actual display, shining phenomena occur in the whole non-display area, resulting in contrast reduction and sever influencing on quality of products.

SUMMARY

In a first aspect, the present disclosure provides a display panel, including a plurality of sub-pixels arranged in an array;
gate line light shielding parts extending in a row direction are arranged on horizontal non-display areas between every two adjacent rows of sub-pixels; vertical non-display areas are arranged between every two sub-pixels adjacent in a row direction; at least one of the vertical non-display areas is provided with a vertical light shielding part, and the vertical light shielding part is configured to prevent two sub-pixels on two sides, in the row direction, of the vertical light shielding part from light leakage at a junction; and a gap is formed between the vertical light shielding part and each of two gate line light shielding parts adjacent to the vertical light shielding part.

Optionally, each of the vertical non-display areas is provided with the vertical light shielding part.

Optionally, the display panel includes a plurality of signal lines extending in a column direction and configured to provide signals for gate lines; and a width of a vertical light shielding part arranged on any of the signal lines is larger than a width of another vertical light shielding part which does not arranged on any of the signal lines.

Optionally, each pixel includes a red sub-pixel, a green sub-pixel and a blue sub-pixel, and the signal lines arranged in the row direction, and the signal lines each is between the red sub-pixel and the blue sub-pixel.

Optionally, a size, in the row direction, of the vertical light shielding part arranged on any of the signal lines ranges from 68 to 70 micrometers.

Optionally, the size, in the row direction, of the vertical light shielding part arranged on any of the signal lines is 69 micrometers.

Optionally, a size, in the row direction, of the other vertical light shielding part which foes not arranged on any of the signal lines ranges from 25 to 27 micrometers.

Optionally, the size, in the row direction, of the another vertical light shielding part which does not arranged on any of the signal lines is 26 micrometers.

Optionally, the gap between the vertical light shielding part and each of the two gate line light shielding parts adjacent to the vertical light shielding part is less than or equal to 20 micrometers.

In a second aspect, the present disclosure further provides a display device, including any display panel provided in the above technical solution.

Icons: 1—vertical light shielding part; 2—red sub-pixel; 3—green sub-pixel; 4—blue sub-pixel; 10—array substrate; 101—Gate metal layer; 102—GI layer; 103—SD metal layer; 104—PVX layer; 105—color resistance layer; 106—organic film layer; 107—ITO pixel electrode/public electrode; 108—OC; 109—PS; and 20—color film substrate.

DETAILED DESCRIPTION OF THE EMBODIMENTS

The embodiments of the present disclosure will be described clearly and completely with reference to the drawings in the embodiments of the present disclosure. The described embodiments are only part of the embodiments of the present disclosure instead of all the embodiments.

Figure 1:
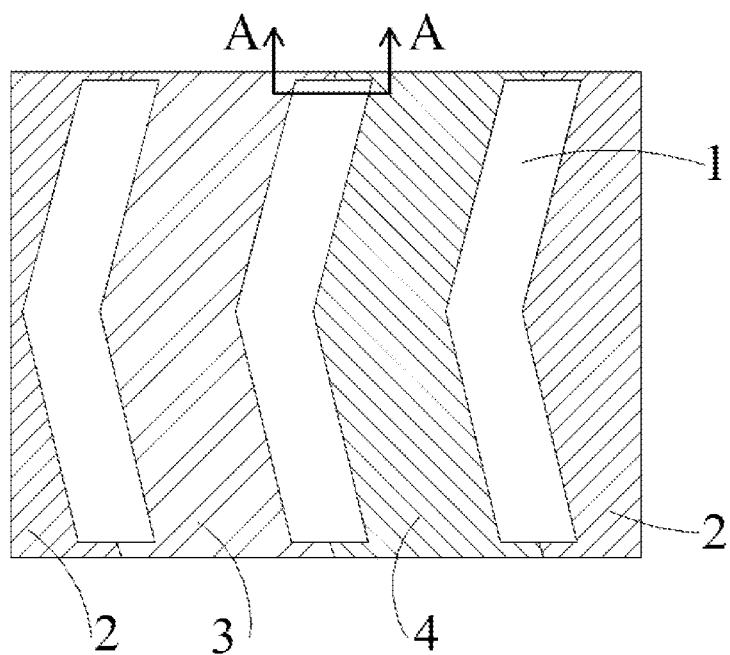
FIG. 1 is a top view of a local structure of a display panel provided by an embodiment of the present disclosure.
Figure 2:
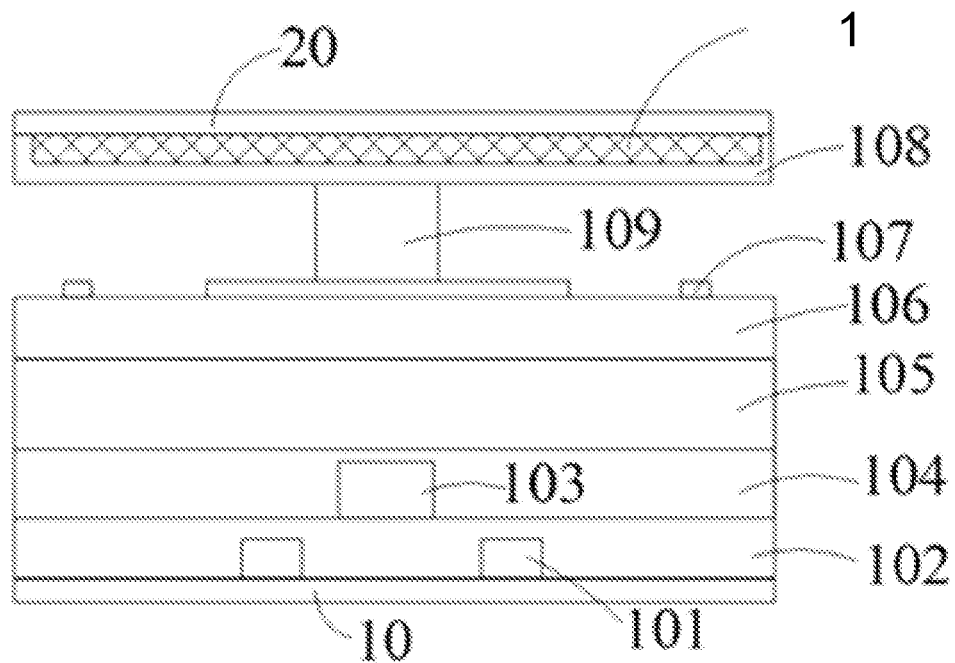
FIG. 2 is an A-A section view of the display panel as shown in FIG. 1.

As shown in FIG. 1 and FIG. 2, a display panel provided by the embodiments of the present disclosure includes a plurality of sub-pixels arranged in an array, and gate line light shielding parts extending in a row direction are arranged on horizontal non-display areas between every two adjacent rows of the sub-pixels; vertical non-display areas are arranged between every two sub-pixels adjacent in a row direction; at least one of the vertical non-display areas are provided with a vertical light shielding part 1, and the vertical light shielding part 1 is configured to prevent two sub-pixels on two sides, in the row direction, of the vertical light shielding part 1 from light leakage at a junction; and a gap is formed between the vertical light shielding part 1 and each of two gate line light shielding parts adjacent to the vertical light shielding part.

The display panel provided by the embodiments of the present disclosure includes the plurality of sub-pixels arranged in an array, the horizontal non-display area is arranged between every two adjacent rows of sub-pixels, the vertical non-display area is arranged between every two adjacent sub-pixels in the row direction, and the gate line light shielding parts extending in the row direction are arranged on the horizontal non-display areas between the two adjacent rows of sub-pixels. Meanwhile, the at least one of the vertical non-display areas is provided with the vertical light shielding part 1, and the vertical light shielding part 1 may shield leaked light at the junction (the junction of the two sub-pixels) of the two sub-pixels located on the two sides of the vertical light shielding part 1 in the row direction, thereby reducing L0 brightness of the vertical non-display area corresponding to the vertical light shielding part 1 and increasing contrast.

Furthermore, each vertical light shielding part 1 is of an independent light shielding structure, and the gap between the vertical light shielding part 1 and each of the two adjacent gate line light shielding parts may prevent the vertical light shielding part 1 from being pulled by the gate line light shielding parts during electrifying, so that light leakage caused by displacement of the vertical light shielding part 1 is avoided, the L0 brightness of the vertical non-display area corresponding to the vertical light shielding part 1 can also be reduced, and the contrast is increased.

Besides, the display panel provided by the embodiments of the present disclosure does not increase the quantity of Mask and a technology process and does not bring extra negative quality influence as well.

It should be noted that after simulation verification, according to the display panel provided by the embodiments of the present disclosure, compared with the prior art, the L0 brightness can be reduced by 19%, and the whole contrast can be increased by 17%.

In an optional implementation, each of the vertical non-display areas is provided with the vertical light shielding part 1.

Each of the vertical non-display areas is provided with the vertical light shielding part 1, so that leaked light between every two adjacent sub-pixels in the row direction can be shielded, the L0 brightness of the display panel is reduced to a greater extent, and the contrast of the display panel is increased.

In an optional implementation, the display panel includes a plurality of signal lines extending in a column direction and configured to provide signals to gate lines, and a width of a vertical light shielding part 1 arranged on any of the signal lines is larger than that a width of another vertical light shielding parts 1 which does not arranged on any of the signal lines so as to better shield an area where the signal lines are located.

In a specific implementation, each pixel includes three sub-pixels arrayed in the row direction, namely a red sub-pixel 2, a green sub-pixel 3 and a blue sub-pixel 4, and the signal lines each is arranged between the red sub-pixel 2 and the blue sub-pixel 4.

Certainly, in other implementations, each of the signal lines may also be located between the red sub-pixel 2 and the green sub-pixel 3 or between the blue sub-pixel 4 and the green sub-pixel 3.

In order to achieve a better light shielding effect, in an optional implementation, a size, in the row direction, of the vertical light shielding part 1 arranged on any of the signal lines ranges from 68 to 70 micrometers.

Preferably, the size, in the row direction, of the vertical light shielding part 1 arranged on any of the signal lines is 69 micrometers.

In order to achieve the better light shielding effect, in an optional implementation, a size, in the row direction, of another vertical light shielding parts 1 except the vertical light shielding parts 1 arranged on the signal lines is set to range from 25-27 micrometers, i.e. the another vertical light shielding part which does not arranged on any of the signal lines ranges from 25 to 27 micrometers.

Preferably, the size, in the row direction, of the another vertical light shielding parts 1 which does not arranged on any of the signal lines is 26 micrometers.

In order to achieve the better light shielding effect while the vertical light shielding parts 1 are prevented from being pulled by the gate line light shielding parts, in an optional implementation, the gap between the vertical light shielding parts 1 and each of the two gate line light shielding parts adjacent to the vertical light shielding part is less than or equal to 20 micrometers.

The display panel provided by the embodiments may be an ADS Pro display panel. As shown in FIG. 2, the display panel further includes an array substrate 10, a Gate metal layer 101, a gate insulation, GI, layer 102, an SD metal layer 103, a PVX layer (passivation layer) 104, a color resistance layer 105, an organic film layer 106, an ITO pixel electrode/public electrode 107, an OC (protective layer) 108, a prismatic spacer, PS, 109 and a color film substrate 20.

A display device provided by the embodiments includes the above display panel. The display panel includes a plurality of sub-pixels arranged in an array, a horizontal non-display area is arranged between every two adjacent rows of sub-pixels, a vertical non-display area is arranged between every two adjacent sub-pixels in a row direction, and the horizontal non-display area between every two adjacent rows of sub-pixels is provided with a gate line light shielding part extending in a row direction; meanwhile, the at least one of the vertical non-display areas is provided with a vertical light shielding part 1, and the vertical light shielding parts 1 can shield leaked light at a junction (the junction of the two sub-pixels) of the two sub-pixels located on two sides of the vertical light shielding part 1, thereby reducing L0 brightness of the vertical non-display area corresponding to the vertical light shielding parts 1 and increasing contrast.

Furthermore, gap between the vertical light shielding part 1 and each of the two adjacent gate line light shielding parts can prevent the vertical light shielding parts 1 from being pulled by the gate line light shielding parts during electrifying, so that light leakage caused by displacement of the vertical light shielding part 1 is avoided, the L0 brightness of the vertical non-display area corresponding to the vertical light shielding part can also be reduced, and the contrast is increased.

Obviously, the skilled in the art may make various modifications and variations to the present disclosure without deviating from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A display panel, comprising a plurality of sub-pixels arranged in an array; wherein
gate line light shielding parts extending in a row direction are arranged on horizontal non-display areas between every two adjacent rows of sub-pixels;
vertical non-display areas are arranged between every two sub-pixels adjacent in a row direction;

each of the vertical non-display areas is provided with a vertical light shielding part, and the vertical light shielding part is configured to prevent two sub-pixels on two sides, in the row direction, of the vertical light shielding part from light leakage at a junction; and a gap is formed between the vertical light shielding part and each of two gate line light shielding parts adjacent to the vertical light shielding part;

wherein the display panel further comprises a plurality of signal lines extending in a column direction and configured to provide signals for gate lines; and a width of a vertical light shielding part arranged on any of the signal lines is larger than a width of another vertical light shielding part which does not arranged on any of the signal lines.

2. The display panel according to claim 1, wherein each pixel comprises a red sub-pixel, a green sub-pixel and a blue sub-pixel arranged in the row direction, and the signal lines each is between the red sub-pixel and the blue sub-pixel.

3. The display panel according to claim 1, wherein a size, in the row direction, of the vertical light shielding part arranged on any of the signal lines ranges from 68 to 70 micrometers.

4. The display panel according to claim 3, wherein the size, in the row direction, of the vertical light shielding part arranged on any of the signal lines is 69 micrometers.

5. The display panel according to claim 1, wherein a size, in the row direction, of the another vertical light shielding part which does not arranged on any of the signal lines ranges from 25 to 27 micrometers.

6. The display panel according to claim 5, wherein the size, in the row direction, of the another vertical light shielding part which does not arranged on any of the signal lines is 26 micrometers.

7. The display panel according to claim 1, wherein the gap between the vertical light shielding part and each of the two gate line light shielding parts adjacent to the vertical light shielding part is less than or equal to 20 micrometers.

8. A display device, comprising a display panel, wherein the display panel comprises a plurality of sub-pixels arranged in an array; wherein gate line light shielding parts extending in a row direction are arranged on a horizontal non-display areas between every two adjacent rows of sub-pixels, vertical non-display areas are arranged between every two sub-pixels adjacent in the row direction;

each of the vertical non-display areas is provided with a vertical light shielding part, and the vertical light shielding part is configured to prevent two sub-pixels on two sides, in the row direction, of the vertical light shielding part from light leakage at a junction; and a gap is formed between the vertical light shielding part and each of two gate line light shielding parts adjacent to the vertical light shielding part;

wherein the display panel further comprises a plurality of signal lines extending in a column direction and configured to provide signals for gate lines; and a width of a vertical light shielding parts arranged on any of the signal lines is larger than a width of another vertical light shielding part which does not arranged on any of the signal lines.

9. The display device according to claim 8, wherein each pixel comprises a red sub-pixel, a green sub-pixel and a blue sub-pixel arranged in the row direction, and the signal lines each is between the red sub-pixel and the blue sub-pixel.

10. The display device according to claim 8, wherein a size, in the row direction, of vertical light shielding part arranged on any of the signal lines ranges from 68 to 70 micrometers.

11. The display device according to claim 10, wherein the size, in the row direction, of the vertical light shielding part arranged on any of the signal lines is 69 micrometers.

12. The display device according to claim 8, wherein a size, in the row direction, of the another vertical light shielding part which does not arranged on any of the signal lines ranges from 25 to 27 micrometers.

13. The display device according to claim 12, wherein the size, in the row direction, of the another vertical light shielding part which does arranged on each of the signal lines is 26 micrometers.

14. The display device according to claim 8, wherein the gap between the vertical light shielding part and each of the two gate line light shielding parts adjacent to the vertical light shielding part is less than or equal to 20 micrometers.

* * * * *